83-751. OR X 9,581 SR
ARTSMAN.
NO PRINTED SPECIFICATION AVAILABLE
A 4358
D. Gerrish,
Reciprocating Saw Mill.
Patented Apr. 11, 1836.
9581 X.
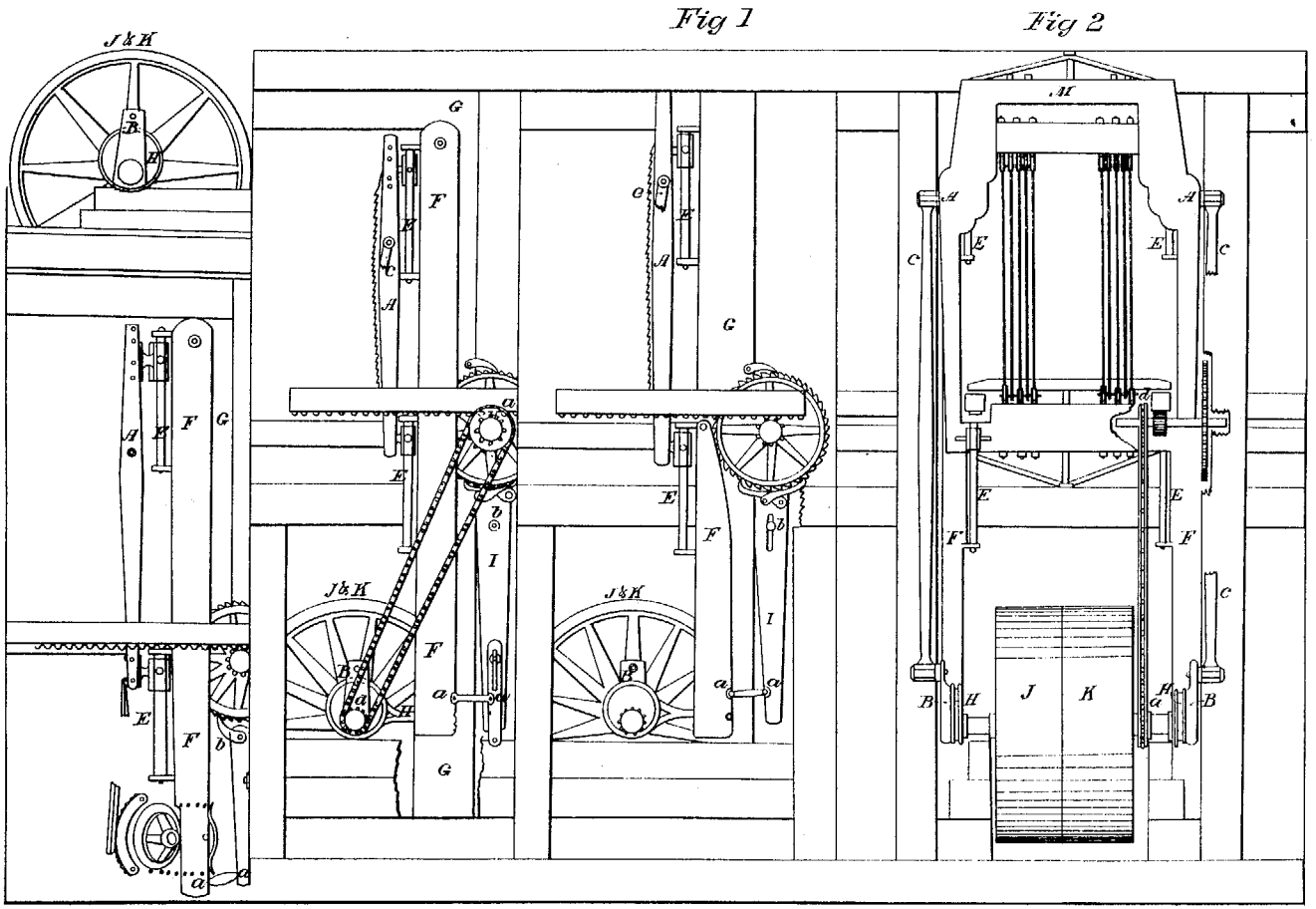
A 100
AM. PHOTO-LITHO. CO. N.Y. (OSBORNE'S PROCESS)

9581 X 4-11-1836

Daniel Gerrish.
Letters Patent. Patented April 11th 1836.

The Schedule referred to in these Letters Patent and making part of the same, containing
a description in the words of the said Daniel Gerrish himself of his improvement in
the Saw Mill.

---

To All Whom It May Concern: Be it known that I Daniel Gerrish of Ports
mouth in the State of New Hampshire have invented certain improvements in the
construction of saw mills and I do hereby declare that the following is a full
and exact description thereof, reference being had to the drawings which accomp-
any and make a part of this specification. Fig. 1 in the accompanying drawings is
an elevation of the saw gate and its appurtenances as seen sideways of the Mill, a
portion of the frame work being removed to exhibit the construction of the es-
sential parts in a more distinct manner. Fig. 2 is an elevation of the saw gate
and other parts in both figures when the same parts are shown they are indicated
by the same letters. A. A is the saw frame which is moved up and down by means
of the cranks B. B. there being as seen in the drawing a crank on each end of the
crank shaft and two pitmen C. C. leading from them, on to each side of the saw
frame, to which I attach them by a joint pin, at a considerable height, say at, or
above the middle of the frame by which means the pitmen may have sufficient
length to operate advantageously with a much less elevation of the floor of the mill
than is usually required. The saw frame does not slide in fender posts, but is guided
in its vibrations by the sockets D. D. which are fitted to, and slide upon the round
rods E. E. The sockets D. D. are made to vibrate upon gudgeons or joint pins in the
manner shown in the drawings instead of being immovably attached to the saw
frame, as this frame besides its vibratory motion up and down, has one also backwards
and forwards which is given to it in a way and for the purpose to be now described.
The upper and lower guide rods Fig. 1. No. 1. No. 2. E. E. E. E. also the inner guide
rods E. E. Fig. 1 and 2 instead of being attached to the fender posts or to any part
of the frame work of the mill is affixed to the vibrating levers F. F. hung by pins
at their upper ends to the posts G. G. as seen in the several figures. The vibrating
levers receive their motion from the eccentrics H. H. operating like the cranks

[illegible] opening and closing the valves in Steam Engines or may be operated
with the application of Cams Fig. 1. No. 1. II. By these means the backward and
forward vibration above spoken of is given to the saw frame, and the saws as they descend
are thrown forward against the wood to be cut, whilst in ascending they are made to
recede from it so as to give clear of any obstruction and to allow a free passage
for the escape of the saw dust. It will be obvious to every machinist that the feed of the
saws in this manner may be regulated either by varying the eccentric, or the swing
of the levers F. F. Instead of the eccentric a cam, capable of easy regulation (see Fig. 1.
No. 1.) may be employed to produce the vibration; it may also be produced by other
means well known to machinist. Behind the levers F. F. are two others, one of
which is seen at I and these may be denominated the feed levers. They may be oper-
ated by extending the arm of the eccentric to them or by a separate connecting
joint as at a, which being made movable will adjust the feed, this may also
be done by a movable fulcrum, or joint pin at b. The ratchets when made to work
in the under side of the ratchet wheel as shown in the drawing must be borne up
against it by springs or by counter weights as by extending them and giving them
sufficient weight on the opposite side of the fulcrum. The carriage is moved forward
in the usual way by a pinion, or lantern on the ratchet wheel shaft, taking into
cogs or teeth on its under side. J and K are a firm and loose pulley or drum upon
the crank shaft, as I prefer to give motion to the saw by means of a strap to run the
carriage back. I employ a chain band C which passes around a whirl d. on the
crank-shaft, which is coupled by means of a clutch to the loose pulley K and thrown
in and out of gear by a lever which may be rendered self acting or may be moved by
hand; the chain band passes also round a pulley on the shaft of the ratchet wheel
and pinion. The feed bands must of course be disengaged from the ratchet wheel when
the carriage is run back, it is not necessary however to particularize such things as are
understood by every competent manager of a saw mill. When gangs of saws are used I employ
straps to strain them which effect the purpose in a very perfect and rapid manner admit-
ting of a change of the number and arrangement of the saws in a more ready way than by
the plans heretofore adopted. The lower ends of the saws are fastened by keys in the usual
way but the straps at the upper ends are tightened by means of screws, and for the purpose
of applying these in the best manner, and also to stiffen the saw frame, I make [illegible]

or mastheads or cross timbers as L and M, into its sides or cheeks to which the straps may
be alternately attached and upon which they are to be strained by screws pressing through
cross straps which connect the upper ends of the staple straps. I further brace the saw
frame by iron braces above and below it, extending from the corners of the frame, form
-ing an acute angle with its top and bottom and ending in an obtuse angle in the
middle; the timbers which occupy the usual place of the fender posts in ordinary
saw mills form parts of a gallows or independent frame to which all the appurte
-nances of the movements are attached, they are independent of the framing of the
mill house by which means that excessive vibration which is so destructive to such
building is completely avoided. What I claim as of my own invention in the above
described mill is first the employment of two cranks and pitmen, the latter attached
to the saw frame in the way described, by which among other advantages the floor of
the mill may be placed considerably lower than usual. Secondly the manner in which
I arrange and fix the guides of the saw frame in combining the swiveling sockets with
the second guide rods behind the saw frame. Thirdly, The application of the eccentric
or of cams or other analogous contrivances upon the crank shafts for the purpose
of vibrating the saw frame backwards and forwards, through the intermediums of
levers to which the lower guide rods of the saw frame are attached as both are ex-
pressed by which means I am able to obtain this vibrating motion on a circle as
much less than that of the sweep of the pitman crank as may be desired. Fourthly
the manner of communicating the feed motion as derived from that of the eccentric
and cams and herein fully described. And I do hereby declare that as this in common
with all complex machinery may admit of numerous modifications whilst the gene-
ral principle of its construction and operation remains unchanged. I do intend by
the foregoing claims to confine myself to the precise manner of fixing and arrang
ing the individual parts as herein laid down, but to vary the same as I may find con
venient, whilst the same ends are attained by analogous means.

Witnesses
Wm. Walker
James Goodrich

Daniel Fenish

[illegible]

([illegible] Recorded, anew December 14. 1840)

( [illegible]

(1408 words)